Patented Sept. 22, 1942

2,296,578

UNITED STATES PATENT OFFICE 2,296,578

CUPRAMMONIUM-CELLULOSE SOLUTION

Paul Henry Schlosser and Kenneth Russell Gray, Shelton, Wash., assignors to Rayonier Incorporated, Shelton, Wash., a corporation of Delaware No Drawing. Application August 22, 1940, Serial No. 353,599½

20 Claims. (Cl. 106—167)

This invention relates to cuprammonium-cellulose solutions and has for its object the provision of an improved method of preparing such solutions. More particularly, the invention aims to provide an improved method of transforming cellulosic materials into cuprammonium-cellulose solutions remarkably free from undissolved materials and lumps, such as undissolved and partly dissolved fibers, gels and undissolved copper salts. It is characteristic of the invention that this transformation of the cellulosic material is brought about with marked economy of chemical and power consumptions. Cuprammonium-cellulose solutions prepared in accordance with the invention may be employed in the manufacture of rayon, staple fiber, transparent films and the like.

Many of the various commercial cuprammonium rayon processes which have been used in the past possess a number of disadvantages and troublesome features. Firstly, most of these processes involve the use of cotton linters, which of course increases the cost as compared to viscose rayon prepared from wood pulp. Where wood pulp was used, it was necessary to first fluff it up in order to put it effectively into solution. In general, such processes did not involve a purification step by steeping in caustic soda and hence where wood pulp was used, greater amounts of hemicellulose impurities would be introduced into the yarn, this being liable to result in a weaker product.

The history of the development of the methods which have heretofore been generally used in industry for preparing cuprammonium solutions of cellulose may be divided into the three following stages:

*Stage I.*—Cellulose was dissolved by the action of solutions which were obtained by treating copper, copper oxide or copper hydroxide with aqueous ammonia. Such processes had the disadvantage that very large proportions of ammonia had to be used to dissolve the copper, and, in any event, it was difficult to make concentrated solutions. Such processes were also not very economical as regards the amount of copper used on the basis of the cellulose.

*Stage II.*—The next step was the replacement of the ammoniacal copper oxide solution by precipitated copper hydroxide purified from admixed by-product salts by washing. The precipitated copper hydroxide was intimately mixed with the cellulose, and then the admixed cellulose and copper hydroxide were simultaneously dissolved by ammonia and mechanical action. This was a considerable improvement over the earlier processes in that less ammonia and copper were required. The chemical and power consumptions, though less, were still quite high. Another disadvantage was that in the preparation of the copper hydroxide, the washing of the slimy precipitated copper hydroxide free from by-product salts was difficult.

*Stage III.*—A considerable further improvement in the process for simultaneously dissolving the cellulose and copper hydroxide was made when, instead of using prepared and purified copper hydroxide, a copper sulphate solution was mixed with the cellulose and then caustic soda was added to precipitate copper hydroxide intimately among the fibers. In some cases the copper sulphate and caustic soda were first mixed together. In such procedures the troublesome operation of washing out by-product sodium sulphate, which was considered to hinder solution of the cellulose, could be replaced by a simpler operation in which the greater part of the sodium sulphate was removed by simply pressing the cellulose-copper hydroxide mixture in a hydraulic press.

In discussing stages II and III of the prior art practices, only the use of copper hydroxide has been mentioned. In certain similar processes, basic copper sulphate was used instead, but the results were, in the main, of the same order.

In the type of procedure represented by stages II and III, copper hydroxide would be mixed with loose cotton linters, or else precipitated on the cellulose fibres from a copper sulphate solution. The cellulose-copper hydroxide mixture would then be dissolved in relatively strong ammonia. A very viscous mass would be formed and, since mixing usually required a considerable time, the power consumption would be high. When the cuprammonium-cellulose solutions were obtained, filtration often presented difficulties due to the presence of large amounts of undissolved and partly dissolved cellulose fibres, and often also due to undissolved copper hydroxide, since it is usually difficult to dissolve copper hydroxide completely in ammonia. Finally, in order to make the solutions spin properly, it was necessary to remove ammonia by evacuation because the excess of ammonia which was required for the preparation of the solution was detrimental later in spinning.

The novel process of the invention represents a considerable advance over all of these previous processes. The process of the invention is extremely economical in regard to both the copper and ammonia required, does not require heavy or complicated mixing machinery and yields excellent solutions which do not require any treatment prior to spinning other than the removal of foreign materials by a single filtration which can be readily made through ordinary filter cloth.

In accordance with the general principles of the invention, the cellulosic material is first converted into a smooth paste by the conjoint action of ammonia and a basic copper salt, or effective equivalents thereof. The conversion may be advantageously carried out in an aqueous medium containing the effective equivalent of (1) a basic copper salt within the range of 1 to 3 mols of copper hydroxide per mol of normal copper salt and (2) ammonia in amount equivalent to at least 4 mols per gram atom of the total copper in the basic copper salt. The amounts of ammonia and basic copper salt (or effective equivalents thereof) employed are such that substantially no solution of the cellulosic material takes place. The resulting paste is next treated at a relatively low temperature, preferably approximating 0° C. (+1 to −3° C.), with an alkali-metal hydroxide (e. g. sodium hydroxide) in amount sufficient for the theoretical conversion of the basic copper salt (or effective equivalent thereof) to copper hydroxide. Since some of the copper of the basic copper salt (or effective equivalent thereof) may be considered as already in the form of copper hydroxide, the amount of alkali-metal hydroxide actually added to the paste need be only that required for the theoretical conversion to copper hydroxide of the normal copper salt constituent of the basic copper salt, so that in this treatment step all of the copper present may be theoretically considered to be in the form of copper hydroxide. The theoretical conversion of the basic copper salt (or effective equivalent thereof) to copper hydroxide takes place in the presence of cellulose and ammonia and no copper hydroxide actually separates out, even though the amount of ammonia present is relatively low. Solution of the cellulose takes place rapidly upon the treatment with the alkali-metal hydroxide, and there results a cuprammonium-cellulose solution substantially free from undissolved copper salts. Any type of cellulose fiber or cellulosic material may be used in practicing the invention, although the invention possesses features which make the use of wood pulp very practical in the preparation of cuprammonium-cellulose solutions. The wood pulp may be used in either sheet or slush form.

In the following discussion, two main modifications of the invention are particularly described as the "A" procedure and "B" procedure, respectively. The "B" procedure is itself divided into three variants or submodifications. In these descriptions of the invention, basic copper sulphate is to be understood as representative of any basic copper salt ranging from $CuX \cdot Cu(OH)_2$ to $CuX \cdot 3Cu(OH)_2$ where X is a bivalent anion (such as $SO_4$ or $CO_3$) or two monovalent anions (such as $Cl_2$), and caustic soda (sodium hydroxide) is a representative alkali-metal hydroxide. Basic copper sulphate has been used merely for the purpose of illustration, and it is to be understood that the sulphate anion may be replaced by a carbonate, chloride or any other innocuous anion. By any of these procedures improved cuprammonium-cellulose solutions of varying cellulose concentrations may be readily and economically prepared. The characteristic features of the invention embodied in all of these modifications may be summarized as follows:

1. The method of the invention may be theoretically considered a copper hydroxide process since when all additions of chemicals have been made, enough alkali-metal hydroxide has been added to theoretically convert all of the copper present to copper hydroxide. The invention, however, is characterized by the fact that this theoretical conversion takes place not only in the presence of cellulose but also in the presence of ammonia, and under these conditions no copper hydroxide separates out, even though the ammonia concentration used is very low. By-product sodium sulphate is present but does not interfere with the dissolving of the cellulose under the characteristic conditions of the invention.

2. During the main or intermediate mixing period, the copper may be considered as present in the form of basic copper sulphate, basic copper carbonate, or other basic copper salt, along with a definite amount of ammonia. The concentrations of ammonia and copper are low enough so that no appreciable dissolving of cellulose takes place at this stage. When the copper is in contact with cellulose fibers in the form of an actual or hypothetical basic copper salt having a composition ranging from $CuX \cdot Cu(OH)_2$ to $CuX \cdot 3Cu(OH)_2$ together with 4 to 6.5 (preferably 5.5 to 6) mols of ammonia per gram atom of the total copper in the basic copper salt and the correct amount of water, there is very little tendency for the cellulose fibers to dissolve, and the properties of the mixture are such that mechanical stirring readily converts the mass to a very smooth paste with the fibers completely dispersed but not appreciably dissolved. The production of the fibrous dispersion at this stage may be carried out at any temperature low enough to prevent volatilization of ammonia (in practice usually below +15° C.). At the end of the intermediate mixing stage, however, it is important that a low temperature (+1 to −3° C.) be attained. This temperature may be attained in any suitable manner, as for example by (a) operating during the intermediate mixing stage with sufficient brine cooling to maintain such a low temperature, (b) operating during the greater part of this stage at a moderately high temperature (up to +15° C.) but applying sufficient brine cooling toward the end of the stage to obtain the low temperature, (c) adding ice directly to the batch at the end of the stage thus reducing the temperature rapidly.

3. When the cellulose fibers have been completely dispersed to a very smooth paste and the temperature has been brought to the required low temperature, caustic soda solution mixed with a small amount of ammonia is added. Enough caustic soda is added to convert the basic copper sulphate to copper hydroxide while the ammonia (1 to 2 mols) mixed with the caustic soda is sufficient to prevent any local coagulation from taking place. The caustic soda addition is made while continuing mechanical stirring. The added chemicals mix in rapidly and then, remarkably enough, there is a practically "flash" dissolving of the cellulose fibers, solution being practically complete in several minutes.

DETAILED DESCRIPTION OF "A" PROCEDURE

In this procedure, basic copper sulphate (or carbonate etc.) in the form of a recovered sludge or a dry commercial powder is first mixed with wood pulp and water, the pulp being thoroughly disintegrated in the mixture. In practice one gram atom of copper or a little less is used per mol (162 grams) of bone dry pulp. These basic copper salts possess important properties, in that (1) when pulp is disintegrated with them and a suitable quantity of water, they spread very smoothly over the cellulose fibers, and (2) when 4 to 6.5 mols of ammonia are then added, stirring readily converts the mixture to a smooth paste with the fibers completely dispersed but with only a small amount of solution (of the cellulose) taking place. With basic salts whose compositions approach closely a composition halfway between that of a normal copper salt and copper hydroxide, there will be no appreciable solution at this stage at all. When complete dispersion has been reached, if external cooling has not been used to attain a low temperature, ice is now directly added to the batch to give a low temperature ($+1$ to $-3°$ C.). Finally a solution containing sufficient sodium hydroxide to convert all the basic copper salt to copper hydroxide is added together with a small amount of ammonia. In practice 1 to 2 mols of ammonia may be used in this way, the amount not being actually critical. Upon this later addition, the fibers dissolve extremely rapidly and completely. An important advantage of the method is that solution starts with the fibers in an extremely well dispersed condition. In the heretofore customary processes, using ammoniacal solutions of copper oxide or a mixture of copper hydroxide and ammonia, there is a considerable tendency at the start for gelatinous lumps of pulp to form which are hard to dissolve, and, due to the high viscosities of such cuprammonium solutions, high powered mixing equipment must be used to obtain the disintegration of the lumps. Also in such processes, unless considerable excesses of copper and ammonia are used, the solutions may contain considerable undissolved matter.

For clarity, it should be repeated that although the method of the invention involves the use of basic copper sulphate (or basic copper carbonate etc.), it is actually a copper hydroxide process, since when all chemical additions have been made, the copper may be considered to be present in the form of copper hydroxide. The important distinction, however, is that prior to solution of the cellulose, a dispersion of the fibers is first obtained in the presence of a copper salt or mixture of salts having an effective composition equivalent to a basic copper salt within the range of 1 to 3 mols of copper hydroxide per mol of normal copper salt and in the presence of 4 to 6.5 mols of ammonia.

Attempts have been made to prepare cuprammonium-cellulose solutions under similar chemical conditions but using either a paste of freshly precipitated copper hydroxide or dry powdered copper hydroxide instead of using basic copper salts and later converting these to the hydroxide by caustic soda addition. In all cases, the solutions contained large amounts of undissolved material, either undissolved cellulose or copper hydroxide or both and in many cases also lumps of undispersed fibers. Using pure copper hydroxide, a smooth intermediate dispersion, such as is obtained in the method of the invention, is not obtained, and moreover, due to the low solubility of the copper hydroxide itself in dilute ammonia of the concentrations contemplated by the invention, it is very difficult to bring the copper hydroxide completely into solution.

While the "A" procedure gives extremely rapid solution of the cellulose under very economical conditions, the procedure possesses one disadvantage in regard to the use of wood pulp of lower alpha content which is overcome in the "B" procedure. The "A" procedure does not permit purifying the pulp by a caustic soda steeping operation unless the steeped pulp is washed free of caustic soda before being used in the cuprammonium procedure. If the steeped pulp should be added without removal of the caustic soda, the basic copper salt will be immediately converted to copper hydroxide with loss of the specially advantageous features of the invention. The "B" procedure besides permitting a steeping operation possesses other advantages hereinafter pointed out.

DETAILED DESCRIPTION OF "B" PROCEDURE

The "B" procedure uses the essential principles of the "A" procedure in that during the intermediate (main) mixing stage, the copper can be considered to be present as a basic copper sulphate having a composition within the range

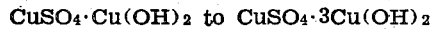
$CuSO_4 \cdot Cu(OH)_2$ to $CuSO_4 \cdot 3Cu(OH)_2$ together with 4 to 6.5 mols of ammonia per gram atom of the total copper in the basic copper sulphate and a large portion of the water to be contained in the final (spinning) solution.

Unlike the "A" procedure, the "B" procedure does not use basic copper sulphate as an added reagent. Instead, the starting material is copper sulphate, which for convenience may be added in the form of an ammoniacal solution, copper sulphate being quite soluble in dilute aqueous ammonia of sufficient concentration to form the complex cupric tetrammino sulphate. In preparing the cuprammonium-cellulose solutions, a basic copper sulphate is formed merely as an intermediate theoretical compound which remains in solution due to the presence of ammonia and cellulose.

When using basic carbonates and basic sulphates in the "A" procedure, only in the case of basic copper carbonate it is usually possible for practical reasons to operate near the $CuX \cdot Cu(OH)_2$ end of the range comprising $CuX \cdot Cu(OH)_2$ to $CuX \cdot 3Cu(OH)_2$. Basic copper sulphates precipitated from an aqueous solution of copper sulphate under conditions such as to give reasonably complete precipitation generally contain $Cu(OH)_2$ in at least as high proportion as represented by $CuSO_4 \cdot 2.5Cu(OH)_2$ to $CuSO_4 \cdot 3.0Cu(OH)_2$, so in using basic copper sulphate in the "A" procedure one is in effect practically restricted to this high copper hydroxide portion of the desirable range unless some copper sulphate is added along with the basic sulphate. With the "B" procedure, however, since the basic copper sulphate composition is only formed in situ, any point in the range between $CuSO_4 \cdot Cu(OH)_2$ and $CuSO_4 \cdot 3Cu(OH)_2$ may be readily used. In practice with the "B" procedure it is usually most advantageous at the intermediate stage to work with a composition close to the $CuSO_4 \cdot Cu(OH)_2$ end of the range. With such a composition practically no dissolving of the fibers takes place at the intermediate stage facilitating mixing and keeping power and cooling costs to a minimum.

The "B" procedure may be so carried out as to require a caustic soda addition in the first step and hence to permit the purifying of the pulp by a caustic soda steeping step and the direct use in the solution process of the steeped pulp in the form of an alkali cellulose.

While the complete "B" procedure may be carried out in a single mixing apparatus and as a continuous operation, there are actually three distinct steps in the procedure, viz: (1) Initial breakdown (2) Intermediate stage and (3) Final stage. The additions of materials for the Initial breakdown and Intermediate stages may be made essentially in three different ways so as to arrive at the same Intermediate stage composition, but it is to be noted that in all three modifications, as well as in the "A" procedure, the characteristically novel principles of the invention are utilized.

In outlining the "B" procedure, the particular modification (No. 1) first considered is the one of most general use, since by it cuprammonium-cellulose solutions can be made either with or without a pulp steeping step.

OUTLINE OF "B" PROCEDURE—MODIFICATION No. 1

1. Initial breakdown

Pulp is broken down to a slurry with an appropriate quantity of water in the presence of caustic soda amounting to 1.0 to 1.5 (usually 1.0) molar equivalents of caustic soda based on the copper to be added in the next step. In the event of purifying the pulp by a steeping operation, most or all of the required caustic soda is contained in the alkali cellulose. Ice may be substituted for part of the water or some external cooling may be applied. While a very low temperature is not required at this stage, it is usually convenient to have a moderately low temperature at this time (0 to +10° C.) in order to facilitate the attainment of the low temperature required at a later stage in the procedure.

2. Intermediate stage

A solution containing 1.0 to 1.06 mols of copper sulphate per mol of cellulose, based on the cellulose analysis in the case of the use of alkali cellulose or per 162 grams of bone dry pulp in the case of unsteeped pulp, together with 4 to 6.5 mols of ammonia is then added to the pulp slurry. Either part or all of the ammonia may be contained in the copper sulphate solution, or, in other words, the added material may be either a theoretical copper tetrammino sulphate solution or a solution of this material containing excess ammonia. It is however, not necessary to add all or even part of the ammonia simultaneously with the copper. The excess over the four mols of ammonia required to give a copper tetrammino sulphate solution or even all the ammonia may be added in the previous initial breakdown. On the other hand, following an initial breakdown with caustic soda and water in the absence of ammonia, an ammonia-free copper sulphate solution may be added, and then after a period of mixing the total ammonia to be present at this stage may be added. In this case, on addition of the copper sulphate, basic copper sulphate is precipitated throughout the fibrous mass. On the subsequent addition of the ammonia, however, the mixture assumes the same characteristics as though the ammonia had been added simultaneously with the copper.

In any event, when the caustic soda, copper salt, ammonia and cellulose have been added in the proportions indicated, the mixture possesses the property of being very readily converted to a very smooth paste in which the fibres are extremely well dispersed.

At the end of the intermediate stage mixing it is necessary to attain a low temperature (+1 to −3° C.) prior to adding the final stage caustic soda-ammonia mixture. Only this final low temperature of the intermediate stage mixing, however, is critical. Actually somewhat higher temperatures (0 to +15° C.) are not harmful in the earlier parts of the intermediate stage mixing and are indeed somewhat beneficial in that better mixing is promoted.

In making a solution of low cellulose content (4%) no external cooling need be used during the intermediate stage, but when the mass is entirely free from lumps and undispersed fibers, a large ice diluent addition is made lowering the temperature to +1 to −3° C. With solutions of medium cellulose concentration it is usually most convenient to obtain temperature control by use of a combination of external cooling and a smaller final ice addition, while with solutions of high cellulose content, the low temperature is most practically attained by use of external cooling alone. While an internal ice addition is in no case necessary, it has the advantage of reducing the temperature very rapidly. This advantage is of particular importance when making cuprammonium-cellulose solutions ultra-rapidly, since in such case the external cooling is not in action for sufficient time to be really effective.

3. Final stage

With the mass completely dispersed as a smooth paste and at a low temperature (+1 to −3° C.), stirring is continued and then a solution added containing sufficient sodium hydroxide to make the total sodium hydroxide addition including the prior addition equal to 2 mols per mol of copper and also containing 1 to 2 mols of ammonia to prevent local coagulation from taking place. This final addition mixes in rapidly, and then there is a practically "flash" dissolving of the cellulose fibers to yield the cuprammonium-cellulose solution. Solution is practically complete within a few minutes, but stirring may be continued longer, mainly for viscosity control.

With cuprammonium-cellulose solutions containing up to 5% cellulose, provided that either low viscosity pulp has been used or that the viscosity has been lowered by shredding and ageing the alkali cellulose, a suitable viscosity may be obtained without any further additions. In the event, however, or using normal viscosity pulps without ageing, or when using solutions of cellulose concentrations greater than 5%, the viscosity may be readily lowered to the correct value by adding to the solution small amounts of a viscosity-reducing agent such as ammonium persulphate.

OUTLINE OF "B" PROCEDURE—MODIFICATION No. 2

This merely represents an inversion of the order described in Modification No. 1 for making chemical additions for the Initial breakdown and Intermediate stage, so as to have present during the greater part of the Intermediate stage mixing and during the Final stage the same compositions as in Modification No. 1.

1. Initial breakdown

Pulp is broken down to a slurry with water containing 1 to 1.06 mols cupric tetrammino sulphate per 162 grams of bone dry pulp. It is desirable to have present during the later intermediate stage mixing 4 to 6.5 mols of ammonia and this difference over the four mols of ammonia theoretically required by cupric tetrammino sulphate may be added to the water along with the cupric tetrammino sulphate solution, or may be contained in that solution as excess ammonia, or may be added later along with the Intermediate stage additions. As in the Initial breakdown for Modification No. 1, ice may be substituted for part of the water.

2. Intermediate stage

A solution containing 1.0 to 1.5 (usually 1.0) molar equivalents of sodium hydroxide based on the copper added in the previous stage is now added. This solution may also contain some ammonia (up to 2.5 mols) per mol of copper for the reason explained in discussing the Initial breakdown. From this point on, all conditions for the Intermediate stage mixing including the required final temperature and the methods for obtaining it are the same as for Modification No. 1.

3. Final stage

Same as for Modification No. 1.

OUTLINE OF "B" PROCEDURE—MODIFICATION NO. 3

This is again merely a further variation of the order of making additions for the Initial breakdown and Intermediate stages to arrive at the same composition at the Intermediate stage and Final stage as in Modification No. 1.

1. Initial breakdown

Pulp is broken down to a slurry with water containing 1 to 1.06 mols of copper sulphate per 162 grams of bone dry pulp. As in Modification No. 1, ice may be substituted for part of the water.

2. Intermediate stage

A solution containing 1.0 to 1.5 (usually 1.0) molar equivalents of sodium hydroxide on the copper added and also 4 to 6.5 mols of ammonia is now added. Instead of adding the ammonia along with the sodium hydroxide, the addition of the ammonia may be delayed a little in order to permit basic copper sulphate to be precipitated by the sodium hydroxide and dispersed throughout the fibrous mass. In any event when the sodium hydroxide and ammonia have both been added, the Intermediate stage mixing is continued as in Modifications Nos. 1 and 2.

Final stage

Same is in Modification No. 1.

STEEPING PROCEDURES FOR PREPARING CUPRAMMONIUM-CELLULOSE SOLUTIONS

The "A" procedure is essentially suited to the use of pulps having a sufficiently high alpha content so that steeping is not required and hence all discussion of steeping procedures will refer to the "B" cuprammonium-cellulose procedure. Cuprammonium-cellulose solutions can be readily prepared by the "B" procedure without steeping the pulp at all according to the methods which have been outlined. With ordinary pulps, however, steeping is used in order to improve the quality of the final product and for this purpose steeping procedures have been developed to give special alkali celluloses containing only about half the proportion of alkali as in the type of alkali cellulose used in normal viscose practice. Satisfactory special alkali celluloses can be advantageously prepared in the two ways described below.

(a) Steeping by macerating in caustic soda solution and centrifuging

A special alkali cellulose containing from 1 to 1.06 mols of sodium hydroxide per mol of cellulose can be prepared while giving the pulp a good alpha purification by macerating in 7.45% sodium hydroxide at 18° C. and then centrifuging. Steeping by macerating and centrifuging is especially suited to the treatment of wet bulk pulp. When wet pulp is used, sufficiently strong NaOH is used to give a 7.45% sodium hydroxide solution including the water contained in the pulp.

While we do not wish to limit ourselves to the foregoing concentration and temperature conditions, we have found that concentrations and temperatures closely approximating the figures specified generally represent the optimum conditions, in view of certain peculiarities involved in steeping by macerating and centrifuging. Firstly, the alkali cellulose is obtained in the form of clumps which do not shred up in an ordinary shredder but merely break up into flakey lumps resembling soap flakes. Nevertheless, although the material is in the form of lumps, if the foregoing optimum steeping conditions have been employed, it yields excellent cuprammonium-cellulose solutions since it later readily disperses at the Intermediate stage of the cuprammonium mixing. The steeping conditions are somewhat critical. With slightly lower sodium hydroxide concentrations, or higher temperatures, there is less swelling and poorer alpha purification. On the other hand if the sodium hydroxide concentration is raised, or the temperature lowered, there is considerably more swelling and a higher alpha purification but the material no longer dissolves completely in the final cuprammonium-cellulose solution.

In this type of procedure, the alkali cellulose is practically non-ageing, and viscosity control is obtained by the use of an appropriate low viscosity pulp, or in the case of normal pulp, by the addition of ammonium persulphate to the final cuprammonium-cellulose solution. In either this or the steeping procedure described below, it is permissible to have the sodium hydroxide content of the alkali cellulose slightly lower than required since a corrective addition can easily be made in the first stage of the cuprammonium-cellulose procedure.

Using the correct conditions, steeping by macerating and centrifuging yields very good cuprammonium-cellulose solutions, very free from undissolved fibers and gels. It should be noted that the conditions of temperature and sodium hydroxide concentration employed in this steeping procedure are such that mercerization does not occur.

(b) Steeping in a steeping press

When using dry sheet pulp it is usually most convenient to steep the pulp in a steeping press, followed by shredding, somewhat in the manner of normal viscose practice.

The sodium hydroxide concentration found best for steeping by macerating and centrifuging has been found to be unsuitable for steeping pulp in sheet form in a steeping press. Using 7.45% sodium hydroxide, the sheets swell very little in the press and then do not shred up properly. Also the alpha cellulose purification obtained is very poor.

The best steeping conditions using a steeping press have been found to be a sodium hydroxide concentration of about 10.0 to 10.3% and a temperature of about 17° to 19° C., followed by pressing the steeped sheets to a fairly low press ratio—about 2.6 based on 94% bone dry pulp. This procedure gives an alkali cellulose of the desired composition—from 1.0 to 1.06 mols of sodium hydroxide per mol of cellulose.

Using these conditions, a good alpha purification is obtained, the product shreds up well and later gives excellent cuprammonium-cellulose solutions. The concentration of 10.0 to 10.3% sodium hydroxide is fairly critical for the procedure. If the sodium hydroxide concentration is lowered only slightly, the steeped pulp will not shred up properly. On the other hand, if the sodium hydroxide concentration is raised only slightly, it is difficult to obtain the required sodium hydroxide-cellulose ratio by pressing.

In contrast to the procedure for steeping by macerating and centrifuging, two things should be noted. Firstly, the sodium hydroxide concentration of 10.0% to 10.3% is just within the region where mercerization occurs at 18° C. Secondly, the shredded alkali cellulose obtained by steeping in 10.0% caustic in contrast to the other product undergoes viscosity ageing and hence viscosity lowering by ammonium persulphate can be dispensed with in favor of alkali cellulose ageing if desired.

When no steeping is used, the pulp is rapidly dissolved in any of the procedures characteristic of the invention, when using only one gram atom of copper per mol of bone dry pulp. When using steeped pulps, it is advisable to use from 1.0 to 1.06 mols of copper based on the amount of cellulose indicated by the alkali cellulose analysis. Also, in preparing cuprammonium-cellulose solutions using pulp from which the hemicelluloses have been largely removed by steeping, considerably better filtering solutions can be obtained if up to 5% sucrose on the pulp is added in the initial breakdown along with the alkali cellulose.

ADVANTAGES AND UNIQUE FEATURES OF THE CUPRAMMONIUM PROCEDURES OF THE INVENTION

1. Both the "A" and "B" procedures use the copper in forms in which it can be readily recovered for re-use. The basic copper sulphate used in the "A" procedure can readily be obtained from waste decoppering acid solutions by alkaline precipitating agents, in the form of a precipitate readily recoverable by filtration or settling. The "B" procedures use copper sulphate which is readily recoverable from spent decoppering acid, either in the form of an aqueous or an ammoniacal solution. The use of the copper thus in the form of a liquid reagent is advantageous in aiding the maintenance of uniformity in preparing cuprammonium-cellulose solutions. There are also special advantages in using the copper sulphate in the form of its ammonia complex; firstly, in the matter of facilitating the ammonia recovery as is described in the copending application of Schlosser, Bennett and Gray filed August 27, 1940, Ser. No. 354,392, and secondly, in that it enables a simple removal of iron from the recovered copper.

2. Actually both the "A" and "B" procedures can be considered copper hydroxide processes since when all additions have been made, enough sodium hydroxide has been added to theoretically convert all the copper to copper hydroxide. An important point however, lies in the fact that this conversion takes place in the presence of both cellulose and ammonia, and under these conditions no difficultly soluble copper hydroxide separates out even though the ammonia concentration is very low. By-product sodium sulphate is present but does not interfere with dissolving the cellulose under the conditions employed.

3. The main and unique features of these procedures is that during the main (intermediate stage) mixing period, there is present the cellulose, together with a theoretical basic copper sulphate composition within the range $CuSO_4 \cdot Cu(OH)_2$ to $CuSO_4 \cdot 3Cu(OH)_2$ and also 4 to 6.5 mols of ammonia. This mixture readily undergoes dispersion to a light blue smooth paste, somewhat greasy in feel, and free from lumps and in which the cellulose fibers are completely and evenly dispersed throughout. With the mixture in this physical condition, if it has not already been brought to a relatively low temperature by external cooling, the temperature is lowered rapidly by means of an internal ice addition. Now, while continuing stirring, sufficient sodium hydroxide to theoretically convert all copper to copper hydroxide is added from a solution containing also one to two mols of ammonia (to prevent local coagulation). On making this addition there is a practically "flash" dissolving of the fibers to yield a cuprammonium-cellulose solution exceedingly free from undissolved and partly dissolved fibers and free from undissolved copper salts.

On the other hand, in the heretofore customary cuprammonium-cellulose processes, dissolving of the cellulose starts to take place immediately on adding to the cellulose an ammoniacal copper hydroxide solution or a mixture of copper hydroxide and ammonia. Even though the cellulose may have been broken down to a slush previously, lumps covered with thick gelatinous "goo" tend to form. This is especially the case when wood pulp is used. Breaking up these lumps takes very good mixing equipment, the mixing usually involves high power cost and the final cuprammonium-cellulose solution usually contains considerable undissolved and partly dissolved fibers unless considerable excesses of copper and ammonia are used and often also contains undissolved copper hydroxide. Such undissolved material tends to clog filters and even after filtering gives poor spinning solutions.

4. The procedures of the invention are extremely economical in regards to quantities of chemicals used. Moreover, neither high powered mixing equipment nor a prolonged stirring period is required. Due to the fact that the main part of the mixing does not take place with the fibers in the form of a viscous solution but rather in the form of a dispersion of fibers in a mixture having a very low viscosity, power costs are very low.

5. There is no troublesome operation such as the removal of by-product sodium sulphate from a precipitated sludge of copper hydroxide as is frequently the case in the prior art procedures. The by-product sodium sulphate remains present in the cuprammonium-cellulose solutions prepared in accordance with the invention, but does not prevent the cellulose from dissolving under the conditions employed. In fact, the procedures of the invention are not hindered by the presence of considerable amounts of additional sodium sulphate over that usually formed in solution, which is of great practical advantage since it means that in the recovery of copper sulphate for re-use a complete separation from sodium sulphate is not required.

6. By the "B" procedure, cuprammonium-cellulose solutions of from 4 to 7% cellulose concentration and of any desired viscosity can be produced readily. With the "A" procedure solutions up to 10% cellulose can be readily produced. On going from the lower to higher cellulose concentrations by either procedure, no relative increase in copper and ammonia in proportion to the cellulose is required. The only change is that less water or ice is used, and, in the case of reducing or eliminating the internal ice additions, compensation for this by external cooling.

7. The procedures are especially adapted to the use of wood pulp. The wood pulp, moreover, does not have to be fluffed up to a form similar to that of loose linters but may be very readily used either in the form of dry sheet pulp of wet bulk pulp.

8. The special pulp steeping methods developed in connection with modification No. 1 of the "B" procedure give good alpha cellulose purification and hence make the use of wood pulp competitive with linters from the standpoint of yarn quality.

9. Cuprammonium-cellulose solutions prepared by the "A" or "B" procedures have exceedingly low undissolved fiber and gel counts, show very good filtrations and spin readily without requiring any treatment other than a readily accomplished filtration. Due to the low ammonia content they can be spun in a spin bath having a low caustic soda concentration (30 grams per liter) without any necessity for ammonia removal treatments first.

10. Cuprammonium-cellulose solutions prepared in accordance with the invention can be filtered prior to spinning through ordinary cloth filters since they do not attack cloth at ordinary temperatures. This is not the case with cuprammonium-cellulose solutions prepared by older methods using considerable excesses of copper and ammonia, since such solutions attack cloth filters. Such solutions must be filtered through other types of filters such as through steel wool or a metal screen with the result that the filtration operation is more difficult and less satisfactory.

11. Certain prior art methods of preparing cuprammonium-cellulose solutions have used (or contemplated the use of) basic copper sulphate as a reagent. The methods of the invention, however, are definitely different from such prior art methods. Firstly, as regards the "B" procedure, basic copper sulphate is not used as a starting material (and need not even be formed on the fibers), but merely occurs at the intermediate stage as a theoretical composition in the presence of ammonia and cellulose. Also, in both the "A" and "B" procedure, the cellulose does not dissolve while the copper is in the form of basic copper sulphate, but a mixture is obtained while the copper is in this state having such physical and chemical properties that a very smooth dispersion of fibers is readily brought about by mechanical means. In the methods of the invention, the ammonia and copper concentrations are low enough so that appreciable solution does not take place until the copper has been converted from a basic salt to copper hydroxide.

We claim:

1. The method of preparing a cuprammonium-cellulose solution which comprises converting cellulosic material without substantial solution thereof into a smooth paste by the conjoint action in an aqueous medium of the constituents of a basic copper salt containing about 1 gram atom of copper per mol of cellulose and ammonia not exceeding 6.5 mols per gram atom of copper, and treating the resulting paste at a temperature around 0° C. with an alkali-metal hydroxide in amount sufficient for the theoretical conversion of the aforesaid basic copper salt to copper hydroxide.

2. The method of preparing a cuprammonium-cellulose solution which comprises converting cellulosic material without substantial solution thereof into a smooth paste by the conjoint action in an aqueous medium of the constituents of a basic copper salt containing about 1 gram atom of copper per mol of cellulose and ammonia not exceeding 6.5 mols per gram atom of copper, and treating the resulting paste at a temperature approximating 0° C. and in the presence of a small additional amount of ammonia with an alkali-metal hydroxide in amount sufficient for the theoretical conversion of the aforesaid basic copper salt to copper hydroxide.

3. The method of preparing a cuprammonium-cellulose solution which comprises converting a cellulosic material without substantial solution thereof into a smooth paste by the conjoint action in an aqueous medium of the constituents of a basic copper salt containing about 1 gram atom of copper per mol of cellulose and ammonia not exceeding 6.5 mols per gram atom of copper, and where said basic copper salt ranges in composition from $CuX \cdot Cu(OH)_2$ to $$CuX \cdot 3Cu(OH)_2$$

where CuX represents a normal cupric salt containing one atom of copper, and treating the resulting paste at a temperature approximating 0° C. and in the presence of a small additional amount of ammonia with sodium hydroxide in amount sufficient for the theoretical conversion of the aforesaid basic copper salt to copper hydroxide.

4. The method of preparing a cuprammonium-cellulose solution which comprises dispersing cellulosic material into a smooth paste in an aqueous medium containing ammonia and the constituents of a basic copper salt containing about 1 gram atom of copper per mol of cellulose, the amount of ammonia not exceeding 6.5 mols per gram atom of copper, and treating the resulting paste at a temperature around 0° C. with an alkali-metal hydroxide in amount sufficient for the theoretical conversion of the aforesaid basic copper salt to copper hydroxide.

5. The method of preparing a cuprammonium-cellulose solution which comprises dispersing cellulosic material without substantial solution thereof into a smooth paste in an aqueous medium containing ammonia and about 1 gram atom of copper per mol of cellulose in the form of the constituents of a basic copper salt ranging from $CuX \cdot Cu(OH)_2$ to $CuX \cdot 3Cu(OH)_2$ where CuX represents a normal cupric salt containing one atom of copper, the amount of ammonia not exceeding 6.5 mols per gram atom of copper, and treating the resulting paste at a temperature approximating 0° C. with sodium hydroxide in amount sufficient for the theoretical conversion of the aforesaid basic copper salt to copper hydroxide.

6. The method of preparing a cuprammonium-cellulose solution which comprises dispersing cellulosic material into a smooth paste in an aqueous medium in the presence of (1) a basic copper salt within the range of 1 to 3 mols of copper hydroxide per mol of normal copper salt and (2) ammonia in amount equivalent to at least 4 mols and not exceeding 6.5 mols per gram atom of the total copper in the aforesaid basic copper salt, and treating the resulting paste at a temperature around 0° C. with an alkali-metal hydroxide in amount sufficient for the theoretical conversion of the aforesaid basic copper salt to copper hydroxide and thereby producing a cuprammonium-cellulose solution.

7. The method of preparing a cuprammonium-cellulose solution which comprises dispersing cellulosic material into a smooth paste in an aqueous medium containing a composition equivalent per mol of cellulose to 4 to 6.5 mols of ammonia and approximately 1 gram atom of copper in the form of a basic copper salt ranging from $CuX \cdot Cu(OH)_2$ to $CuX \cdot 3Cu(OH)_2$ where CuX represents a normal cupric salt containing one atom of copper, and treating the resulting paste at a temperature approximating 0° C. and in the presence of a small additional amount of ammonia with sodium hydroxide in amount at least sufficient for the theoretical conversion of the aforesaid basic copper salt to copper hydroxide and thereby producing a cuprammonium-cellulose solution substantially free from undissolved and partly dissolved fibers and from undissolved copper salts.

8. The method of preparing a cuprammonium-cellulose solution which comprises dispersing cellulosic material into a smooth paste in an aqueous medium containing the constituents per mol of cellulose of (1) about 1 gram atom of copper in the form of a basic copper salt within the range of 1 to 3 mols of copper hydroxide per mol of normal copper salt and (2) from 4 to 6.5 mols of ammonia, and dissolving the dispersed cellulosic material to form a cuprammonium-cellulose solution by treating said paste at a temperature approximating 0° C. and in the presence of 1 or 2 additional mols of ammonia with about 2 mols of added sodium hydroxide per mol of normal copper salt contained in the aforesaid basic copper salt.

9. The method of preparing a cuprammonium-cellulose solution which comprises forming cellulosic material into a slurry with water in the presence of at least one of the chemical compounds employed in providing the constituents of the basic copper salt and ammonia hereinafter recited, dispersing the cellulosic material of the resulting slurry without substantial solution of cellulose into a smooth paste in an aqueous medium in the presence of the constituents of (1) a basic copper salt within the range of 1 to 3 mols of copper hydroxide per mol of normal copper salt and (2) ammonia in amount equivalent to at least 4 mols per gram atom of the total copper in the aforesaid basic copper salt, and treating the resulting paste at a temperature around 0° C. with an alkali-metal hydroxide in amount sufficient for the theoretical conversion of the aforesaid basic copper salt to copper hydroxide and thereby producing a cuprammonium-cellulose solution.

10. The method of preparing a cuprammonium-cellulose solution which comprises forming cellulose material into a slurry with water in the presence of at least one of the chemical compounds employed in providing the constituents of the basic copper salt and ammonia hereinafter recited, dispersing the cellulosic material of the resulting slurry without substantial solution of cellulose into a smooth paste in an aqueous medium in the presence of the constituents of (1) a basic copper salt within the range of 1 to 3 mols of copper hydroxide per mol of normal copper salt and (2) at least 4 mols of ammonia per mol of normal copper salt required to provide the aforementioned constituents of a basic copper salt, and treating the resulting paste at a temperature approximating 0° C. and in the presence of a small additional amount of ammonia with sodium hydroxide in amount sufficient for the theoretical conversion of the aforesaid basic copper salt to copper hydroxide and thereby producing a cuprammonium-cellulose solution.

11. The method of preparing a cuprammonium-cellulose solution which comprises forming a cellulosic material into a slurry with water in the presence of an alkali-metal hydroxide, dispersing the cellulosic material of the resulting slurry without substantial solution of cellulose into a smooth paste in an aqueous medium to which a normal copper salt and ammonia are added in such amounts that (1) the alkali-metal hydroxide and the normal copper salt form theoretically a basic copper salt within the range of 1 to 3 mols of copper hydroxide per mol of normal copper salt and (2) the ammonia is equivalent to at least 4 mols per mol of the added normal copper salt, the aqueous medium containing about 1 gram atom of copper per mol of cellulose, and treating the resulting paste at a temperature around 0° C. with an alkali-metal hydroxide in amount sufficient with the alkali-metal hydroxide initially present for the theoretical conversion of all the copper present to copper hydroxide and thereby producing a cuprammonium-cellulose solution.

12. The method of preparing a cuprammonium-cellulose solution which comprises forming a cellulosic material into a slurry with water in the presence of sodium hydroxide, dispersing the cellulosic material of the resulting slurry without substantial solution of cellulose into a smooth paste in an aqueous medium containing in addition to said sodium hydroxide such added amounts of a normal copper salt and ammonia that (1) the sodium hydroxide and the normal copper salt form theoretically a basic copper salt within the range of 1 to 3 mols of copper hydroxide per mol of normal copper salt and (2) at least 4 mols of ammonia are present per mol of the added normal copper salt, and treating the resulting paste at a temperature approximating 0° C. and in the presence of a small additional amount of ammonia with sodium hydroxide in amount sufficient with the sodium hydroxide initially present for the theoretical conversion of all the copper present to copper hydroxide and thereby producing a cuprammonium-cellulose solution.

13. The method of preparing a cuprammonium-cellulose solution which comprises forming a cellulosic material into a slurry with water in the presence of the effective equivalent of a copper tetrammino salt, said copper tetrammino salt being present in the amount of about 1 mol per mol of cellulose and containing not more than 2.5 mols excess of ammonia per mol of salt, dispersing the cellulosic material of the resulting slurry without substantial solution of cellulose into a smooth paste in an aqueous medium to which an alkali-metal hydroxide is added in such amount that the alkali-metal hydroxide and the normal copper salt of said copper tetrammino salt form theoretically a basic copper salt within the range of 1 to 3 mols of copper hydroxide per mol of normal copper salt, and treating the resulting paste at a temperature around 0° C. with an alkali-metal hydroxide in amount sufficient with the alkali-metal hydroxide previously added for the theoretical conversion of all the copper present to copper hydroxide and thereby producing a cuprammonium-cellulose solution.

14. The method of preparing a cuprammonium-cellulose solution which comprises forming a cellulosic material into a slurry with water in the presence of the effective equivalent of a copper tetrammino salt, said copper tetrammino salt being present in the amount of about 1 mol per mol of cellulose and containing not more than 2.5 mols excess of ammonia per mol of salt, dispersing the cellulosic material of the resulting slurry without substantial solution of cellulose into a smooth paste in an aqueous medium to which sodium hydroxide is added in such amount that the sodium hydroxide and the normal copper salt of said copper tetrammino salt form theoretically a basic copper salt within the range of 1 to 3 mols of copper hydroxide per mol of normal copper salt, and treating the resulting paste at a temperature approximating 0° C. and in the presence of a small additional amount of ammonia with sodium hydroxide in amount sufficient with the sodium hydroxide previously added for the theoretical conversion of all the copper present to copper hydroxide and thereby producing a cuprammonium-cellulose solution.

15. The method of preparing a cuprammonium-cellulose solution which comprises forming a cellulosic material into a slurry with water in the presence of a normal copper salt, dispersing the cellulosic material of the resulting slurry without substantial solution of cellulose into a smooth paste in an aqueous medium to which ammonia and an alkali-metal hydroxide are added in such amounts that (1) the alkali-metal hydroxide and the normal copper salt form theoretically a basic copper salt within the range of 1 to 3 mols of copper hydroxide per mol of normal copper salt and (2) the ammonia is equivalent to at least 4 mols per mol of normal copper salt present in said slurry-forming step, and treating the resulting paste at a temperature around 0° C. with an alkali-metal hydroxide in amount sufficient with the alkali-metal hydroxide previously added for the theoretical conversion of all the copper present to copper hydroxide and thereby producing a cuprammonium-cellulose solution.

16. The method of preparing a cuprammonium-cellulose solution which comprises forming a cellulosic material into a slurry with water in the presence of a normal copper salt, dispersing the cellulosic material of the resulting slurry without substantial solution of cellulose into a smooth paste in an aqueous medium to which ammonia and sodium hydroxide are added in such amounts that (1) the sodium hydroxide and the normal copper salt form theoretically a basic copper salt within the range of 1 to 3 mols of copper hydroxide per mol of normal copper salt and (2) at least 4 mols of ammonia are present per mol of normal copper salt present in said slurry-forming step, and treating the resulting paste at a temperature approximating 0° C. and in the presence of a small additional amount of ammonia with sodium hydroxide in amount sufficient with the sodium hydroxide previously added for the theoretical conversion of all the copper present to copper hydroxide and thereby producing a cuprammonium-cellulose solution.

17. The method of preparing a cuprammonium-cellulose solution which comprises treating cellulosic material with sodium hydroxide to produce a treated cellulose containing from 1.0 to 1.5 mols of sodium hydroxide per mol of cellulose, dispersing the treated cellulose without substantial solution thereof into a smooth paste in an aqueous medium containing the constituents of a normal copper salt and ammonia, said normal copper salt being present in amount such that the copper content of the paste will be about 1 gram atom of copper per mol of cellulose and said ammonia being present in the amount of from 4–6.5 mols per gram atom of copper, and treating the resulting paste at a temperature approximating 0° C. and in the presence of a small additional amount of ammonia with sodium hydroxide in amount sufficient with that present in said treated cellulose for the theoretical conversion of all the copper present to copper hydroxide and thereby producing a cuprammonium-cellulose solution.

18. The method of preparing a cuprammonium-cellulose solution which comprises treating cellulosic material with sodium hydroxide to produce a treated cellulose containing about 1 to 1.5 mols of sodium hydroxide per mol of cellulose, dispersing the treated cellulose into a smooth paste in an aqueous medium to which is added per mol of cellulose the equivalent of about 1 to 1.06 mols of a normal copper salt and about 4 to 6.5 mols of ammonia, and treating the resulting paste at a temperature approximating 0° C. and in the presence of a small additional amount of ammonia with sodium hydroxide in amount sufficient with that present in said treated cellulose to equal about 2 mols per mol of normal copper salt added as aforesaid to the aqueous medium.

19. The method of preparing a cuprammonium-cellulose solution which comprises steeping cellulosic material at a temperature of about 18° C. in an alkali solution containing about 7.45% of sodium hydroxide, centrifuging the steeped cellulosic material until its sodium hydroxide content is from 1 to 1.06 mols per mol of cellulose, dispersing the centrifuged cellulosic material without substantial solution thereof in an aqueous medium in the presence per mol of cellulose of (1) about 1 gram atom of copper in the form of a basic copper salt within the range of 1 to 3 mols of copper hydroxide per mol of normal copper salt and (2) from 4 to 6.5 mols of ammonia, and dissolving the dispersed cellulosic material to form a cuprammonium-cellulose solution by treating said paste at a temperature around 0° C. with sodium hydroxide in amount sufficient with that present in the aforesaid centrifuged steeped cellulose for the theoretical conversion of all the copper present to copper hydroxide.

20. The method of preparing a cuprammonium-cellulose solution which comprises steeping cellulosic material in a steeping press at a temperature of about 17–19° C. with an alkali solution containing about 10–10.3% of sodium hydroxide, pressing the steeped cellulosic material until its sodium hydroxide content is from 1 to 1.06 mols per mol of cellulose, dispersing the pressed cellulosic material without substantial solution thereof in an aqueous medium in the presence of the constituents per mol of cellulose of (1) about 1 gram atom of copper in the form of a basic copper salt within the range of 1 to 3 mols of copper hydroxide per mol of normal copper salt and (2) from 4 to 6.5 mols of ammonia, and dissolving the dispersed cellulosic material to form a cuprammonium-cellulose solution by treating said paste at a temperature around 0° C. with sodium hydroxide in amount sufficient with that present in the aforesaid pressed steeped cellulose for the theoretical conversion of all the copper present to copper hydroxide.

PAUL HENRY SCHLOSSER.
KENNETH RUSSELL GRAY.